(12) United States Patent
Yeh

(10) Patent No.: US 10,877,724 B1
(45) Date of Patent: Dec. 29, 2020

(54) SPORTS BOARD WITH A SOUND MODULE

(71) Applicant: Tzong In Yeh, Dana Point, CA (US)

(72) Inventor: Tzong In Yeh, Dana Point, CA (US)

( * ) Notice: Subject to any disclaimer, the term of this patent is extended or adjusted under 35 U.S.C. 154(b) by 0 days.

(21) Appl. No.: 16/735,075

(22) Filed: Jan. 6, 2020

(30) Foreign Application Priority Data

Nov. 22, 2019 (TW) .............................. 108142654 A

(51) Int. Cl.
```
G06F 3/16      (2006.01)
H04R 1/02      (2006.01)
H04R 3/00      (2006.01)
H04R 29/00     (2006.01)
A63C 11/00     (2006.01)
```

(52) U.S. Cl.
CPC .............. *G06F 3/165* (2013.01); *H04R 1/025* (2013.01); *H04R 3/00* (2013.01); *H04R 29/001* (2013.01); *A63C 11/003* (2013.01)

(58) Field of Classification Search
CPC ...... H04R 1/025; H04R 299/001; H04R 3/00; A63C 11/003; G06F 3/165
See application file for complete search history.

(56) References Cited

U.S. PATENT DOCUMENTS

| | | | |
|---|---|---|---|
| 6,539,336 B1* | 3/2003 | Vock | A42B 3/0433 |
| | | | 702/178 |
| 7,053,288 B2 | 5/2006 | Iwai et al. | |
| 2012/0027223 A1* | 2/2012 | Zapalac | H04R 1/028 |
| | | | 381/86 |
| 2019/0085540 A1* | 3/2019 | Thadhani | E03C 1/0408 |

FOREIGN PATENT DOCUMENTS

| | | |
|---|---|---|
| CN | 1275669 C | 9/2006 |
| CN | 206644932 U | 11/2017 |

* cited by examiner

*Primary Examiner* — Regina N Holder
(74) *Attorney, Agent, or Firm* — Muncy, Geissler, Olds & Lowe, P.C.

(57) ABSTRACT

A sports board apparatus includes a sports board and a sound module. The sports board includes a lower face for sliding and an upper face for supporting a user. The sound module is connected to the sports board, and includes a power supply and a circuit electrically connected to the power supply. The circuit comprises a vibration sensor, an audio controller electrically connected to the vibration sensor, and a speaker electrically connected to the audio controller. The audio controller actuates the speaker to provide sound like that from a vehicle in operation when the vibration sensor senses vibration.

9 Claims, 3 Drawing Sheets

SPORTS BOARD WITH A SOUND MODULE

BACKGROUND OF INVENTION

1. Field of Invention

The present invention relates to a sports board such as a snow sled and, more particularly, to a sports board equipped with a sound module.

2. Related Prior Art

A conventional snow sled enables a user to enjoy snow sledding. However, the user hears nothing but wind or environmental noise. The conventional snow sled fails to provide the user with any other type of entertainment.

The present invention is therefore intended to obviate or at least alleviate the problems encountered in prior art.

SUMMARY OF INVENTION

It is the primary objective of the present invention to provide a sports board apparatus that provides sound in operation.

To achieve the foregoing objective, the sports board apparatus includes a sports board and a sound module. The sports board includes a lower face for sliding and an upper face for supporting a user. The sound module is connected to the sports board, and includes a power supply and a circuit electrically connected to the power supply. The circuit includes a vibration sensor, an audio controller electrically connected to the vibration sensor, and a speaker electrically connected to the audio controller. The audio controller actuates the speaker to provide sound like that from a vehicle in operation when the vibration sensor senses vibration.

In another aspect, the sound module includes a power switch electrically arranged between and connected to the power supply and the circuit, and operable to provide electricity to the circuit from the power supply or not.

In another aspect, the sound module includes a shell and a cover. The shell is inserted in the sports board and used to contain the power supply and the circuit. The cover is connected to the shell, visible on the upper face of the sports board, and formed with apertures.

In another aspect, the power switch is supported on the cover.

In another aspect, the sports board apparatus includes a skin connected to the upper face of the sports board. The sound module is located under the skin. The skin includes apertures corresponding to the sound module.

In another aspect, the sound provided by the sound module is like that from a sports car equipped with an engine.

In another aspect, the vibration sensor is replaced with a speed sensor. The audio controller actuates the speaker to provide the sound when the speed sensor senses that speed of the sports board apparatus reaches a predetermined value. Preferably, the audio controller actuates the speaker to provide different sounds when the speed sensor senses different values of the speed of the sports board apparatus.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
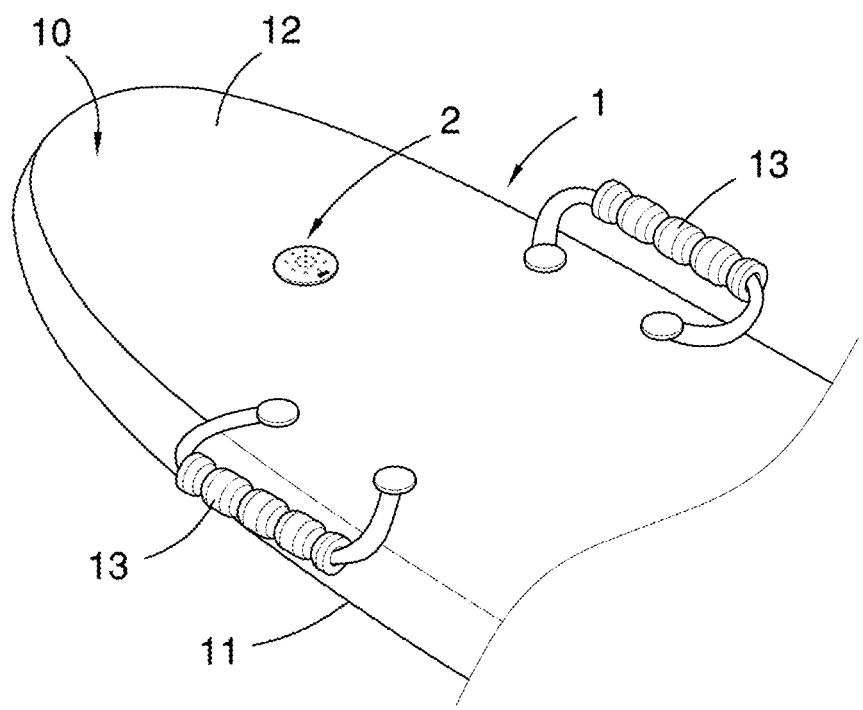
FIG. 1 is a partial perspective view of a sport board apparatus according to the first embodiment of the present invention.
Figure 2:
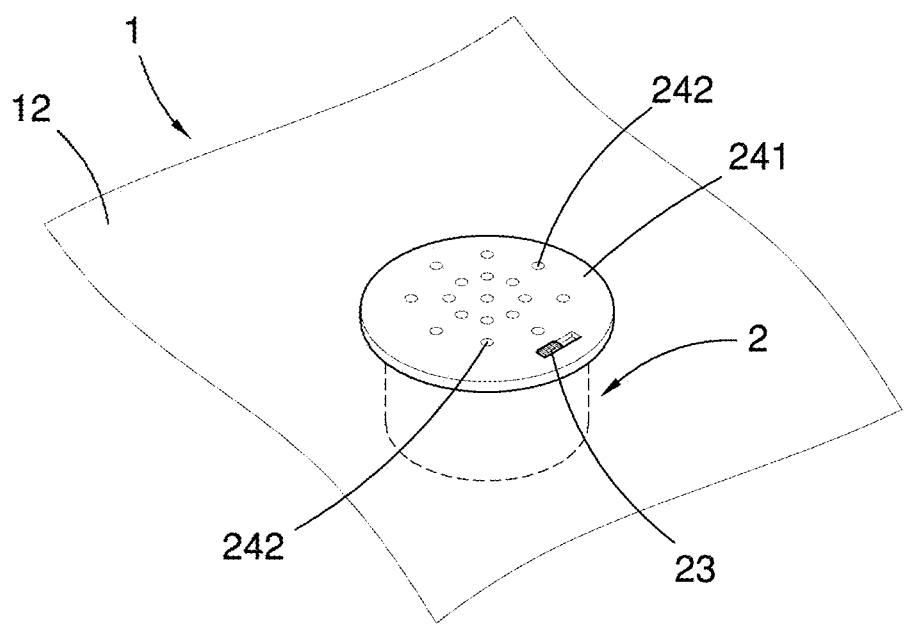
FIG. 2 is a perspective view of an audio module of the sport board apparatus shown in FIG. 1.
Figure 3:
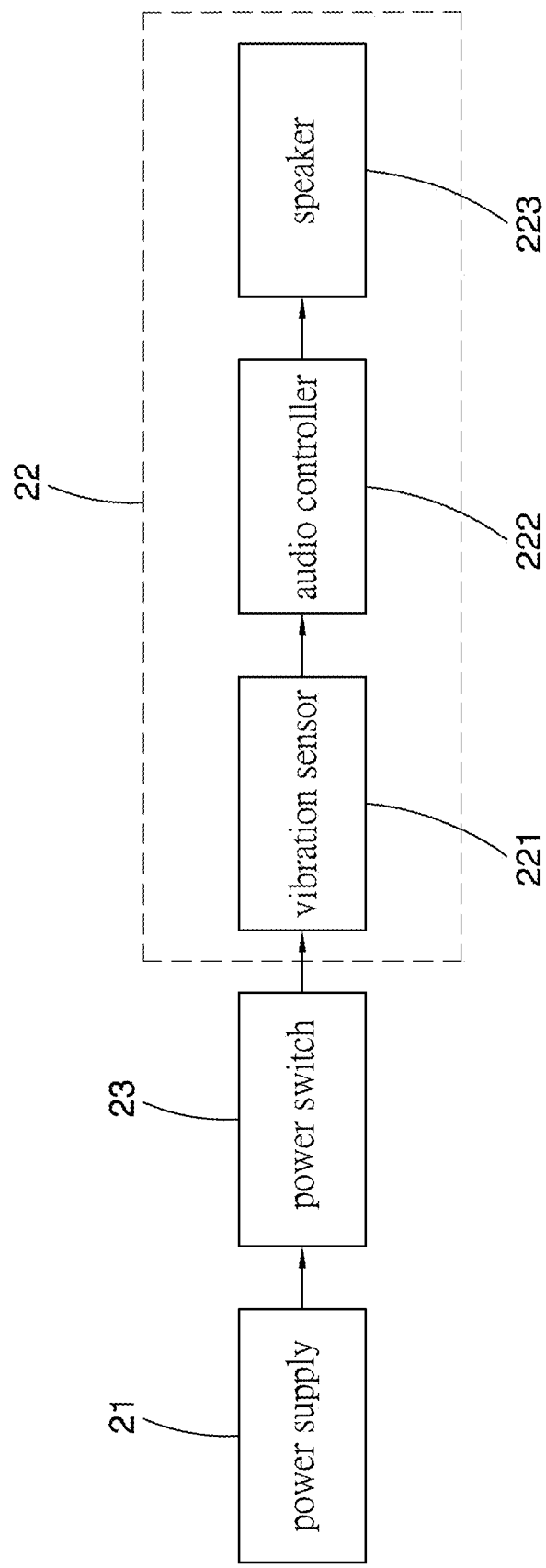
FIG. 3 is a block diagram of a circuit used in the audio module shown in FIG. 1.

Referring to FIGS. 1 through 3, a sports board apparatus includes a sports board 1 (only a front portion is shown in FIG. 1) and a sound module 2 in accordance with a first embodiment of the present invention. The sound module 2 is connected to the sports board 1. The sports board 1 includes a lower face 11 for sliding on snow and an upper face 12 for supporting a user. Referring to 3, the sound module 2 includes a power supply 21 and a circuit 22. The power supply 21 provides the circuit 22 with electricity. Referring to FIG. 2, the sound module 2 further includes a shell 24 inserted in the sports board 1. The shell 24 contains the power supply 21 and the circuit 22. The shell 24 is covered by a cover 241 that is visible on the upper face 100 of the sports board 1. The cover 241 includes apertures 242. Sound provided by the circuit 22 can be spread to the exterior of the sports board 1 through the apertures 242.

The sports board 1 is a snow sled, a grass board, a sand board, a surfboard or any other sports board for use on a surface of water. In the first embodiment, the sports board 1 is a snow sled with two handles 13 located on two sides. The user can hold the handles 13 with two hands.

Preferably, the sports board 1 includes a skin 10. The upper face 12 of the sports board 1 is an upper face of the skin 10. The skin 10 can includes foam skin or foam skin coated with a plastic firm printed with a patter.

The power supply 21 can include at least one battery or solar cell. Alternatively, the power supply 21 can include a combination of at least one battery with at least one solar cell. The at least one battery provides electricity instead of the solar cell when the solar cell fails to provide adequate electricity.

Preferably, the sound module 2 further includes a power switch 23 electrically arranged between and connected to the power supply 21 and the circuit 22. The power switch 23 is supported on the cover 241 of the shell 24. The user power can operate the switch 23 to provide electricity to the circuit 22 from the power supply 21 or not. However, the power switch 23 is not necessary. The power switch 23 is in the form of a button or in another proper form.

Figure 4:
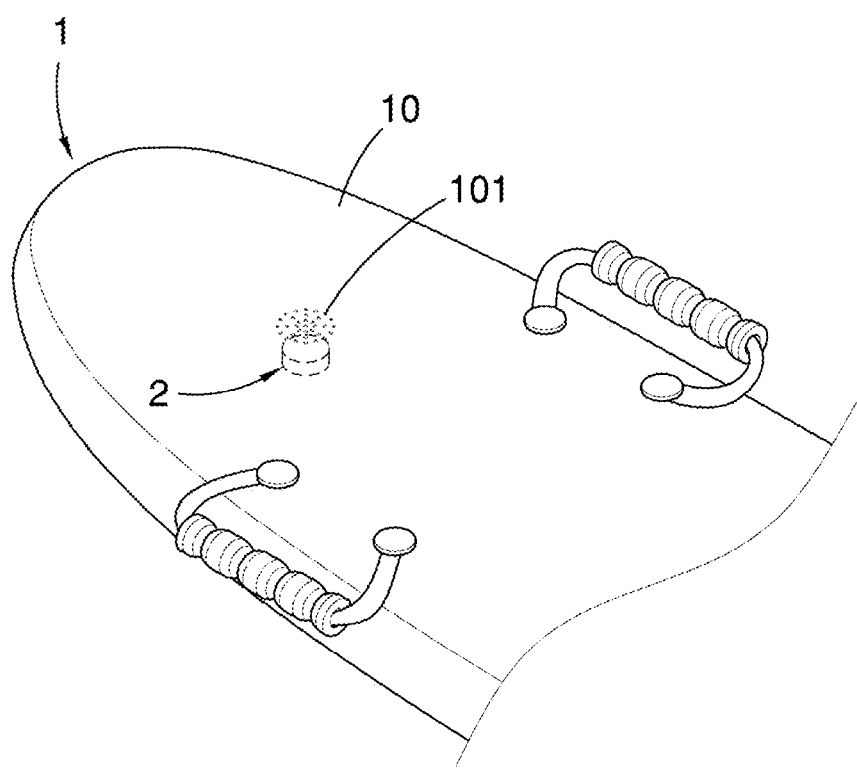
FIG. 4 is a partial perspective view of a sport board apparatus according to the second embodiment of the present invention.

Referring to FIG. 4, there is shown a sports board apparatus according to a second embodiment of the present invention. In the second embodiment, the sound module 2 is located under the skin 10 of the sports board 1, i.e., the sound module 2 is not visible on the skin 10. The skin 10 includes apertures 101 corresponding to the sound module 2. Thus, the sound provided by the sound module 2 is spread to the exterior of the sports board 1 via the apertures 101. In this case, the power switch 23 can be a button located beneath the skin 10. Thus, the user can feel the power switch 23 beneath the skin 10 and operate the power switch to provide electricity to the circuit 22 from the power supply 21. The power switch 23 can alternatively be a sensory switch (sensor). The sensory switch is located under or beneath the skin 10. Thus, when the user puts a hand in the vicinity of a certain region of the skin 10, the sensory switch senses the hand and provides electricity to the circuit 22 from the power supply 21. The second embodiment is otherwise identical to the first embodiment.

In an embodiment, the skin 10 is made with an aperture (not shown) which allows access to the power switch 23. Thus, the user can operate the power switch 23 conveniently.

Referring to FIG. 3, the circuit 22 includes a vibration sensor 221, an audio controller 222 electrically connected to the vibration sensor 221, and a speaker 223 electrically connected to the audio controller 222. The audio controller 222 actuates the speaker 223 to provide sound like that from a vehicle in operation equipped with an engine when the vibration sensor 221 senses vibration. The sound of the vehicle in operation is the sound from the engine in operation, including but not limited to the sound from the engine at a certain speed or in acceleration. The vehicle is preferably but not limited to a sports car. For example, the audio controller 222 can actuate the speaker 223 to provide sound like that from an air plane, a yacht, a motorcycle or any other vehicle.

When the vibration sensed by the vibration sensor 221 of the circuit 22 energized by the power supply 21 reaches a predetermined value, the sports board 1 is very likely in a down-sliding process. Now, the vibration sensor 221 sends a signal to the audio controller 222, and the audio controller 222 accordingly instructs the speaker 223 to provide sound like that from the vehicle in operation. Thus, increased is the fun in using the sports board 1. When the vibration sensor 221 does not sense any vibration at all or the vibration is smaller than the predetermined value, the sports board 1 is very likely not in operation, e.g., stored in a storeroom, laid on a floor, or transported in a vehicle. Now, the vibration sensor 221 does not send any signal to the audio controller 222 so that the speaker 223 is quiet.

Where the power switch 23 is used, the power switch 23 must be operated to provide electricity to the circuit 22 from the power supply 21 to enable the sports board apparatus to provide the sound like that of the vehicle in operation. When the power switch 23 is operated to electrically disconnect the power supply 21 from the circuit 22, the sports board 1 cannot provide any sound in operation or not.

Preferably, the vibration sensor 221 can be replaced with another proper sensor such as a speed sensor. The speed sensor sends a signal to the audio controller 222 to actuate the speaker 223 to provide the sound like that from the vehicle in operation only when the speed sensor senses a speed higher than a predetermined limited.

Moreover, the speed sensor can send different signals to the audio controller 222 to actuate the speaker 223 to provide different sounds when the speed sensor senses different values of the speed. For example, a high pitch or a loud sound is provided when the sports board apparatus is at high speed, a low pitch or a quiet sound is provided when the sports board apparatus is at low speed. Thus, the sports board apparatus provides different sounds according to different values of the speed.

As discussed above, the sports board apparatus provides the sound like the vehicle in operation when it is in operation. Thus, increased is the fun in the use of the sports board apparatus.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A sports board apparatus comprising:
   a sports board comprising a lower face for sliding and an upper face for supporting a user; and
   a sound module connected to the sports board, and comprising a power supply and a circuit electrically connected to the power supply, wherein the circuit comprises a vibration sensor, an audio controller electrically connected to the vibration sensor, and a speaker electrically connected to the audio controller, and the audio controller actuates the speaker to provide sound like that from a vehicle in operation when the vibration sensor senses vibration, in which, the sound module further comprises a shell, the shell is inserted in the sports board and used to contain the power supply and the circuit, a cover connected to the shell, visible on the upper face of the sports board, and formed with apertures.

2. The sports board apparatus according to claim 1, wherein the sound module comprises a power switch electrically arranged between and connected to the power supply and the circuit, and operable to provide electricity to the circuit from the power supply or not.

3. The sports board apparatus according to claim 2, wherein the power switch is disposed on the cover of the shell.

4. The sports board apparatus according to claim 1, wherein the sound provided by the sound module is like that from a sports car equipped with an engine.

5. The sports board apparatus according to claim 1, wherein the vibration sensor is replaced by a speed sensor, and the audio controller actuates the speaker to provide sound like that from a vehicle in operation when the speed sensor senses that speed of the sports board apparatus reaches a predetermined value.

6. The sports board apparatus according to claim 5, wherein the audio controller actuates the speaker to provide different sounds when the speed sensor senses different values of the speed of the sports board apparatus.

7. A sports board apparatus comprising:
   a sports board comprising a lower face for sliding and an upper face for supporting a user; and
   a sound module connected to the sports board, and comprising a power supply and a circuit electrically connected to the power supply, wherein the circuit comprises a vibration sensor, an audio controller electrically connected to the vibration sensor, and a speaker electrically connected to the audio controller, and the audio controller actuates the speaker to provide sound like that from a vehicle in operation when the vibration sensor senses vibration, in which, a skin connected to the upper face of the sports board, wherein the sound module is located under the skin, and the skin comprises apertures corresponding to the sound module.

8. The sports board apparatus according to claim 7, wherein the sound module comprises a power switch electrically arranged between and connected to the power supply and the circuit, and operable to provide electricity to the power supply from the power switch or not, and the power switch is located under the skin and selected from the group consisting of a button and a sensory switch.

9. The sports board apparatus according to claim 7, wherein the sound module comprises a power switch electrically arranged between and connected to the power supply and the circuit, and operable to provide electricity to the power supply from the power switch or not, and the skin comprises an aperture which allows access to the power switch.

* * * * *